US010627812B2

(12) United States Patent
Eggert et al.

(10) Patent No.: US 10,627,812 B2
(45) Date of Patent: Apr. 21, 2020

(54) RISK BASED DRIVER ASSISTANCE FOR APPROACHING INTERSECTIONS OF LIMITED VISIBILITY

(71) Applicant: HONDA RESEARCH INSTITUTE EUROPE GMBH, Offenbach/Main (DE)

(72) Inventors: Julian Eggert, Offenbach (DE); Tim Puphal, Offenbach (DE); Tsukasa Sugino, Offenbach (DE); Florian Damerow, Uelversheim (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 221 days.

(21) Appl. No.: 15/895,325

(22) Filed: Feb. 13, 2018

(65) Prior Publication Data

US 2018/0231974 A1    Aug. 16, 2018

(30) Foreign Application Priority Data

Feb. 14, 2017 (EP) ..................................... 17156080

(51) Int. Cl.
*G05D 1/00* (2006.01)
*G08G 1/16* (2006.01)
*B60W 30/095* (2012.01)

(52) U.S. Cl.
CPC ....... *G05D 1/0055* (2013.01); *B60W 30/0956* (2013.01); *G05D 1/0088* (2013.01); *G08G 1/166* (2013.01)

(58) Field of Classification Search
None
See application file for complete search history.

(56) References Cited

U.S. PATENT DOCUMENTS 5,926,114 A     7/1999  Andrews
8,244,408 B2 *  8/2012  Lee .................. B60W 30/0953
                                              180/169

(Continued)

OTHER PUBLICATIONS

Luis Barba et al., "Computing a Visibility Polygon Using a Few Variables", Nov. 15, 2011, 10 pages.

(Continued)

*Primary Examiner* — Richard M Camby
(74) *Attorney, Agent, or Firm* — Squire Patton Boggs (US) LLP

(57) ABSTRACT

An automotive driver assistance for a vehicle with an improved capability to handle obstructed sensor coverage includes steps of acquiring sensor data on an environment of the vehicle from at least one sensor, of generating an environment representation based on the acquired sensor data and of predicting at least one behavior of the vehicle. The method determines at least one area in the environment of the vehicle wherein for the at least one area either a confidence for the sensor data is below a threshold or no sensor data is available and generates at least one virtual traffic entity in the at least one determined area, wherein the virtual traffic entity is adapted to interact with the at least one predicted behavior of the vehicle. A risk measure for each combination of the at least one virtual traffic entity and the predicted behavior of the vehicle is estimated, the calculated risk measure is evaluated and a controlling action for the vehicle is executed based on the evaluated risk measure.

11 Claims, 7 Drawing Sheets

(56) References Cited

U.S. PATENT DOCUMENTS

| | | | | |
|---|---|---|---|---|
| 8,831,813 B1* | 9/2014 | Ferguson | ................ | B60T 7/042 |
| | | | | 701/23 |
| 9,836,895 B1* | 12/2017 | Nygaard | .............. | G07C 5/0841 |
| 10,228,690 B2* | 3/2019 | Bostick | ................ | B60W 30/00 |

OTHER PUBLICATIONS

Jon Louis Bentley, "Multidimensional Binary Search Trees Used for Associative Searching", Communications of the ACM, vol. 18, No. 9, Sep. 1975, pp. 509-517.

Florian Damerow et al., "Balancing Risk Against Utility: Behavior Planning Using Predictive Risk Maps", IEEE Intelligent Vehicles Symposium (IV), Jun. 28-Jul. 1, 2015, pp. 857-864.

Julian Eggert, "Predictive Risk Estimation for Intelligent ADAS Functions", IEEE 17th International Conference on Intelligent Transportation Systems, Oct. 2014, 8 pages.

* cited by examiner

RISK BASED DRIVER ASSISTANCE FOR APPROACHING INTERSECTIONS OF LIMITED VISIBILITY

BACKGROUND

Field

The invention relates automotive driver assistance or autonomous driving functions for vehicles, in particular a method, a system and a vehicle for risk based driver assistance with an improved capability to handle obstructed sensor coverage.

Description of the Related Art

Contemporary intelligent advanced driver assistance systems (ADAS) for vehicles are developed to include the capability to detect obstacles in a path of an ego-vehicle and to avoid collisions of the ego-vehicle with a detected obstacle. The detection of obstacles is achieved by equipping the ego-vehicle with sensors, for example radar sensors and cameras. The sensors monitor the area forward of the ego-vehicle and acquire sensor data including information on the actual traffic scene ahead of the ego-vehicle. The ADAS uses the acquired sensor data on the observed traffic scene to determine upcoming obstacles, other vehicles and based thereon, to take an appropriate action, for example to warn a driver of the ego-vehicle or to automatically initiate an evasive maneuver of the ego-vehicle.

A specific functionality of an ADAS is an intersection warning system. A current intersection warning system assesses the traffic situation and upcoming hazards solely on the actual sensor data of a sensor mounted on the ego-vehicle. For example, trajectories of all traffic participants on the intersection to determine possible future collisions are predicted and, for example values for a time-to-collision (TTC) between the ego-vehicle and other traffic participants are calculated. However, the capability of the sensor to reliably detect other traffic objects may be limited by occlusions in the environment of the ego-vehicle. For example, buildings, terrain or other traffic participants may limit a field of view of the sensor (sensor coverage).

In order to overcome the restricted sensor coverage of the ego-vehicle, a known cooperative approach proposes to use communication systems such as vehicle-to-vehicle-, vehicle-to-infrastructure and infrastructure-to-vehicle-communication to integrate additional sensor information from other, spatially distributed sensors to enhance the sensor data from the on-board sensor of the ego-vehicle. The ADAS is thereby enabled to provide a comprehensive and almost complete view of the actual traffic environment at the intersection by taking the additional, externally acquired sensor data into account.

U.S. Pat. No. 5,926,114 proposes an intersection warning system including a vehicle-side system arranged in a vehicle and a road-side system. The vehicle-side system includes a radar covering a forward area of the vehicle. The road-side system is arranged at an intersection and includes a vehicle watching unit(s) for monitoring the lanes intersecting each other at the intersection and for detecting vehicles approaching the intersection. A signal returning unit of the road-side system is provided for each of the lanes intersecting each other and returns a virtual reflected signal corresponding to a reflected radar signal to the vehicle, when the vehicle watching unit detects vehicles approaching the intersection.

However, a complete monitoring of the environment of the ego-vehicle according to prior art is beyond reach, as only intersections with an installed and working road-side system component provide the additional sensor data required for covering the entire environment without any gaps of on-board sensor coverage. This would require massive investments and is even then not capable to handle dynamic occlusions for example occlusions by lorries or trains.

Moreover, most current traffic participants are not equipped with the necessary communication systems, for example infrastructure-to-vehicle systems.

Therefore the problem of overcoming the problem of gaps, for example by occluded areas in sensor coverage for advanced driver assistance systems or autonomous driving systems is to be addressed which overcome the cited deficiencies.

SUMMARY

The technical problem is solved by the method according to claim 1 and the corresponding system, mobile device and program.

The dependent claims define further advantageous embodiments.

A method for controlling a mobile device using a driver assistance system or an autonomous driving system comprises steps of acquiring sensor data on an environment of the mobile device from at least one sensor and generating an environment representation based on the acquired sensor data. At least one behavior of the mobile device is predicted. The method further includes a step of determining at least one area in the environment of the mobile device, wherein for the at least one area either a confidence for the sensor data is below a threshold or no sensor data is available. At least one virtual traffic entity in the at least one determined area is generated, wherein at least one behavior of the virtual traffic entity is predicted which can influence the at least one predicted behavior of the mobile device. A risk measure for each combination of the at least one behavior of the virtual traffic entity and the predicted behavior of the mobile device is estimated and the risk measure is evaluated. A controlling action for the mobile device is then executed based on the evaluated risk measure.

The term risk defines a probability of some critical event that might occur in the future multiplied with a severity of impacts when the critical event actually occurs. Such critical event may for example be a collision between the ego-vehicle and another vehicle (target vehicle) or a virtual traffic entity. The severity may for example include a relative collision speed between the colliding ego-vehicle and the target vehicle or the hypothetic traffic scene entity at a time of the collision, vehicle masses, collision directions, impact points, . . . .

The term virtual traffic entity denotes a traffic participant for which there is no direct evidence in the sensor data, for example as the virtual traffic entity is an area (region) in the theoretic coverage area of the sensor, for which no sensor data exists or no sensor data with sufficient reliability can be acquired by the sensor. The existence of this virtual traffic entity is assumed by the inventive method as are the states of the virtual traffic entity, for example a speed or a mass.

The proposed method assesses the risk, for example at an intersection with an ego-vehicle's on-board sensor, even in case other traffic entities are difficult or impossible to detect. The claimed method estimates critical occluded area(s), models virtual traffic entities with specific behaviors in the critical area(s) and calculates the risk involved with these virtual traffic entities. The risk involved with the virtual traffic entities may be termed virtual risk, and represents a risk which would apply when the virtual traffic entity becomes a real traffic entity which is not detected due to the gap in sensor coverage.

The method evaluates the driver's currently performed behavior and his predicted behavior in the immediate future when approaching an intersection of limited visibility to take an appropriate action such as to warn in case the behavior is determined as critical. Thus, the claimed method takes limitations in sensor capabilities and sensor coverage into account for generating a risk sensitive prediction of future traffic scene evolvement. The method achieves this even without requiring further hardware components of the ADAS. The method steps may be implemented in software modules stored in a memory of the ADAS and running on one or more processors connected with the memory. The method therefore provides a traffic risk estimation scheme which not only considers risk sources perceivable by sensors or communicated by vehicle-to X communication, but also from hidden risk sources inaccessible to sensors due to sensor limitations such as occlusions.

A further advantageous characteristic of the claimed method is its capability to handle complex traffic scenarios in case a sensor component, for example such as a transmit/ receive element of a radar sensor covering a certain sector of the environment, fails, or a vehicle-to-X communication link to external sensors breaks down.

Based on an estimated area of sight for a driver of the ego-vehicle, the method augments the driver's sensory perceived environment with potentially present, but not perceivable critical traffic scene entities. For those potentially present virtual traffic entities a worst-case like behavior from a viewpoint of the ego-vehicle is determined and a corresponding risk, for example an upcoming collision is evaluated. The resulting risk model can be can then be used to enrich the traffic scene analysis of the ADAS with potential hazards resulting from insufficient sensor coverage. Furthermore the resulting risk model can be used to evaluate a driver's behavior in terms of risk. The risk model can accordingly be used to warn the driver that his current behavior is considered as critical or hazardous. The risk model may be employed to provide suggestions to the driver how to minimize traffic related risks. By employing the inventive method, the ADAS gains the capability of behaving of a human driver acting with foresight.

An advantageous embodiment of the method for controlling a mobile comprises a step of predicting at least one virtual behavior of the at least one virtual traffic entity, and in the step of estimating a risk measure, a risk measure for each combination of the virtual behavior of the at least one virtual traffic entity and each predicted behavior of the mobile device is estimated.

An embodiment of the method for controlling a mobile device calculates a utility measure for each predicted behavior of the mobile device. In the step of executing a controlling action for the mobile device, the controlling action is determined based on the calculated risk measure and the calculated utility measure.

The utility of a predicted behavior of the ego vehicle, for example a predicted trajectory of the ego-vehicle measures a benefit of the trajectory in form of achieving goals and/or fulfilling behavior constraints. For example, if driving with predetermined constant velocity is set as a goal for the ego-vehicle, the utility measure of a predicted trajectory depends on a deviation of the predicted velocity on the predicted trajectory from the predetermined constant velocity. In this example a suitable utility measure may be defined based on a difference predicted velocity on the predicted trajectory from the predetermined constant velocity. If for example, the goal is to arrive a specific spatial target, the utility of a predicted trajectory might be evaluated by the time which is required to arrive at the spatial target on the predicted trajectory. Further utility measures may be defined based on driving comfort, measurable by parameters such a small acceleration and deceleration values (mild braking) and/or economic considerations, for example minimizing fuel consumption.

According to an embodiment of the method for controlling a mobile device in the step of executing a controlling action, at least one of issuing a warning to a driver of the mobile device if the estimated risk measure exceeds a predetermined risk threshold, of supporting a driver initiated driving action of the mobile device or of performing autonomously the driving action of the mobile device is executed.

The method for controlling a mobile device according to an embodiment is characterized in that in the step of acquiring sensor data on an environment of the mobile device, map data of the environment of the vehicle is acquired.

The acquired map data forms a readily available base for determining the occluded areas due to static objects in the sensor coverage and line-of-sight based algorithms for determining those occluded areas.

It is particularly advantageous if the acquired map data includes information on buildings and/or environment entities, which form the dominant static structures obstructing sensor coverage.

The method for controlling a mobile device according to a further embodiment determines in the step of determining the at least one area in the environment of the mobile device, a sensor position and a sensor orientation in the environment representation and sensor coverage occlusions based on the map data, in particular information on building and environment entities.

A further embodiment of the method for controlling a mobile device obtains further risk information and further predicted behavior of at least one target object in the environment of the mobile device, wherein the at least one target object is detected by the at least on sensor. The obtained further risk information and further predicted behavior of the at least one target object are fused with the estimated risk measure to generate fused risk and behavior data, wherein in the step of evaluating the risk measure, the fused risk and behavior data is evaluated and in the step of executing the controlling action, the controlling action is executed based on the evaluated fused risk and behavior data.

A second aspect of the claimed invention relates to a system for controlling a mobile device, the system comprising an acquiring unit configured to acquire sensor data on an environment of the mobile device from at least one sensor, an environment modelling unit configured to generate an environment representation based on the acquired sensor data and a prediction unit configured to predict at least one behavior of the mobile device. The system further includes a coverage gap determining unit is configured to determine at least one area in the environment of the mobile device, wherein for the at least one area either a confidence for the sensor data is below a threshold or no sensor data is available. A virtual traffic entity determining unit is configured to generate at least one virtual traffic entity in the at least one determined area, wherein the virtual traffic entity is adapted to interact with the at least one predicted behavior of the mobile device. A risk estimation unit is configured to estimate a risk measure for each combination of the at least one virtual traffic entity and the predicted behavior of the mobile device. An evaluation unit is configured to evaluate the calculated risk measure and a vehicle control unit is configured to then execute a controlling action for the mobile device based on the evaluated risk measure.

The individual units (modules) of the system for controlling a mobile device may be implemented in separate hardware devices like individual processors interacting with each other or in form of plural software modules, stored in one or more memories and running on a processor when executed. The mobile device may advantageously a vehicle termed ego-vehicle in the description of the invention.

The system for controlling a mobile device may be a driver assistance system or an autonomous driving system for a mobile device.

A third aspect of the invention relates to a mobile device, in particular a land, sea or air vehicle equipped with the system for controlling a mobile device.

A fourth aspect of the invention solves the problem by a computer program (computer program-product) with program-code means for executing the steps according to any of the before mentioned embodiments, when the program is executed on a computer or a digital signal processor. The program can be stored on a machine-readable data carrier.

BRIEF DESCRIPTION OF THE DRAWINGS

The structure of the system, the different method steps and the various advantages of using such a method and system will become apparent from the discussion of the embodiments, in which.

DETAILED DESCRIPTION

Generally, the invention is in the field of mobility systems and in assistance in operating mobility systems. A mobility system or mobile device can be a vehicle, in particular a car or a motor cycle. The mobility system can also be a watercraft (vessel), an air vehicle or a space vehicle. The vehicle may be controlled by a user (person) on board of the vehicle or may be remotely controlled from a remote control position (facility). The vehicle may be partially or fully autonomously operating. Respectively, the user (operator) of the vehicle and the assistance method can be a driver (vehicle driver), a rider in case of a motorcycle or a pilot of the vehicle. Furthermore, in case of a remotely controlled vehicle, the user may be an operator of a remotely piloted vehicle who performs vehicle control from a position detached from the vehicle.

Operating a vehicle is to be understood in present application as driving (piloting) the vehicle or performing at least one of the tasks such as steering, accelerating or decelerating (braking), navigating or supervising the operation of the vehicle.

The described embodiments focus on an intersection warning system for discussing the invention and its advantages. It is evident, that any other ADAS or autonomous navigation system for a robot may benefit from the claimed invention and is respectively claimed in the attached patent claims defining the invention.

The following embodiments focus on an intersection warning system and coping with risks encountered at intersections caused by other traffic participants approaching an intersection. It is apparent that other driving assistance systems and functions of an ADAS may equally benefit from the taken approach. For example an adaptive cruise control system (ACC) may equally benefit from assessing risks which originate from occlusion of lanes by buildings and other vehicles.

The term traffic participant includes any agent that participates in the traffic environment, for example vehicles, bicycles and pedestrians in case of a traffic environment.

The inventive approach mimics the behavior of a driver controlling his car with foresight. Approaching an intersection with restricted observability, the risk-aware driver would slow down in order to be able to stop in case another non-detectable entity with right-of-way appears. Once the intersection can be accessed by the ego-vehicle's sensors to an extent, that a safe crossing can be ensured, the ego-entity can keep on driving. Safely passing the intersection is thus ensured.

Figure 1:
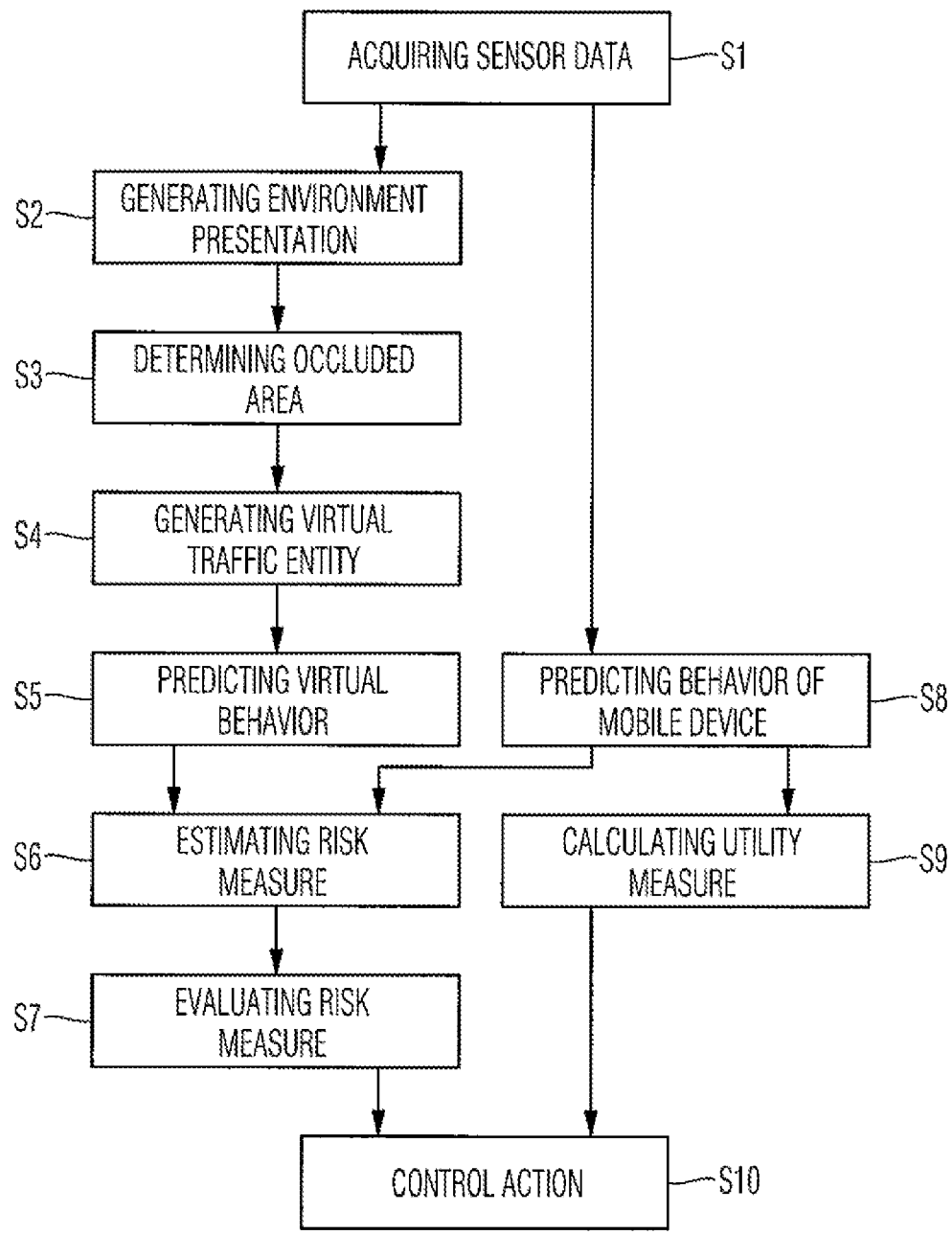
FIG. 1 shows a flowchart for a driver assistance system according to an embodiment.

FIG. 1 shows a flowchart for a driver assistance system 1 according to an embodiment. The method for controlling vehicle uses a driver assistance system or an autonomous driving system in an autonomously operating vehicle.

The method starts with step S1 of acquiring sensor data comprising information on an environment of the mobile device (ego vehicle) from at least one sensor, for example a camera, in particular a stereo camera or one or more radar sensors.

In step S2 the acquired sensor data is used to generate an environment representation which is based on the acquired sensor data.

In a subsequent step S3, the method further determines at least one area in the environment of the mobile device, wherein for the at least one area either a confidence for the sensor data is below a threshold or even no sensor data at all is available, for example due to objects such as buildings obstructing the view of the sensor.

In step S4 at least one virtual traffic entity in the at least one determined area is generated, wherein the virtual traffic entity is adapted to interact with the at least one predicted behavior of the mobile device. The term virtual traffic entity denotes a traffic participant for which there is no direct evidence in the sensor data, for example as the virtual traffic entity is in an area (region) in the theoretic coverage area of the sensor, for which no sensor data exists or no sensor data with sufficient reliability can be acquired. The existence of this virtual traffic entity is then assumed by the inventive method as are the states of the virtual traffic entity, for example a speed or a mass of the virtual traffic entity. This virtual traffic entity may for example assumed to represent another vehicle in the occluded area which poses a danger to the ego-vehicle. Accordingly the virtual traffic entity would be assigned the characteristics, for example a virtual speed acceleration and deceleration values of a vehicle in its driving behavior for further consideration in the method.

In step S5, a virtual behavior for the virtual traffic entity is predicted. This prediction of the virtual behavior may be performed according to a usual method for predicting a behavior of traffic participants known in the art. Preferably, a same method for predicting the future behavior of the virtual traffic entity as for predicting a behavior of the ego-vehicle in a step S8 is used. Step S8 is preferably also executed based on the acquired sensor data and provides at least one future trajectory describing a future driving path of the ego-vehicle. Step S8 may additionally or alternatively be performed based on the environment representation generated in step S2. Step S8 can also take into account any other vehicles which are detected in the acquired sensor data.

In step S6 succeeding to step S5, a risk measure for each combination of the at least one virtual traffic entity and the predicted behavior of the ego vehicle is estimated or calculated. The calculation of the risk measure is based on the predicted virtual behavior of the virtual traffic entity and the predicted behavior of the ego-vehicle.

The calculated risk measure is evaluated in step S7. A controlling action for the ego-vehicle is then executed based on the evaluated risk measure. The risk measure may correspond to a probability of a critical event such as a virtual collision or a virtual distance between the ego-vehicle and the virtual traffic entity that might occur in the future multiplied with a severity of consequences when the critical event actually occurs. The severity of consequences may for example include a relative collision speed between the colliding ego-vehicle and another vehicle or the hypothetic traffic scene entity at a time of the collision, vehicle masses, collision directions, impact points.

An advantageous embodiment of the method for controlling the ego-vehicle comprises the step S5 of predicting at least one virtual behavior of the at least one virtual traffic entity, and in step S6 of estimating a risk measure, a risk measure for each combination of the virtual behavior of the at least one virtual traffic entity and each predicted behavior of the ego-vehicle is estimated.

The method for controlling an ego-vehicle further calculates in step S9 a utility measure for each predicted behavior of the ego-vehicle. The utility measure of a predicted behavior of the ego-vehicle comprises for example for a predicted trajectory of the ego-vehicle a measure a benefit of the trajectory in form of achieving driving goals and fulfilling behavior constraints. If driving with a predetermined constant velocity is set as a driving goal for the ego-vehicle, the utility measure of a predicted trajectory can depend on a deviation of the predicted velocity when driving on the predicted trajectory from the predetermined constant velocity. A suitable utility measure may then be defined based on a difference between predicted velocity on the predicted trajectory and the predetermined constant velocity. If a pre-set driving goal is to arrive a specific location (spatial target), the utility of a predicted trajectory might be evaluated by the time which is required to arrive at the location when following the predicted trajectory. Further utility measures may be defined based on driving comfort, measurable by parameters such a small acceleration and deceleration values (mild braking) and/or economic considerations, for example minimizing a fuel consumption. The driving goal may also be a weighted combination of different elementary driving goals.

Step S9 may be omitted in a driving assistance system 1 which concentrates exclusively on a risk-based driver assistance.

In step S10, a control action for the ego-vehicle is determined based on the calculated risk measure and possibly the calculated utility measure. The control action may comprise at least one of issuing a warning to a driver of the ego-vehicle if the estimated risk measure exceeds a predetermined risk threshold, of supporting a driver initiated driving action of the ego-vehicle or of performing autonomously the driving action of the ego-vehicle is executed. A warning may be an acoustic, a visual or a haptic warning of the driver of an imminent risk and is particularly useful in a driver assistance system. Supporting a driver initiated action may comprise supporting a steering action by exerting a force on a steering wheel or on a braking or acceleration lever operated by the driver. In case of an autonomously operating vehicle, the control action may include basic control actions setting an acceleration value or a deceleration value for the vehicle and/or initiating a lateral evasive movement. The control action may include also more complex control actions such as performing a lane change if the overall traffic situation and the specific risk recommends such procedure for minimizing a risk.

Figure 2:
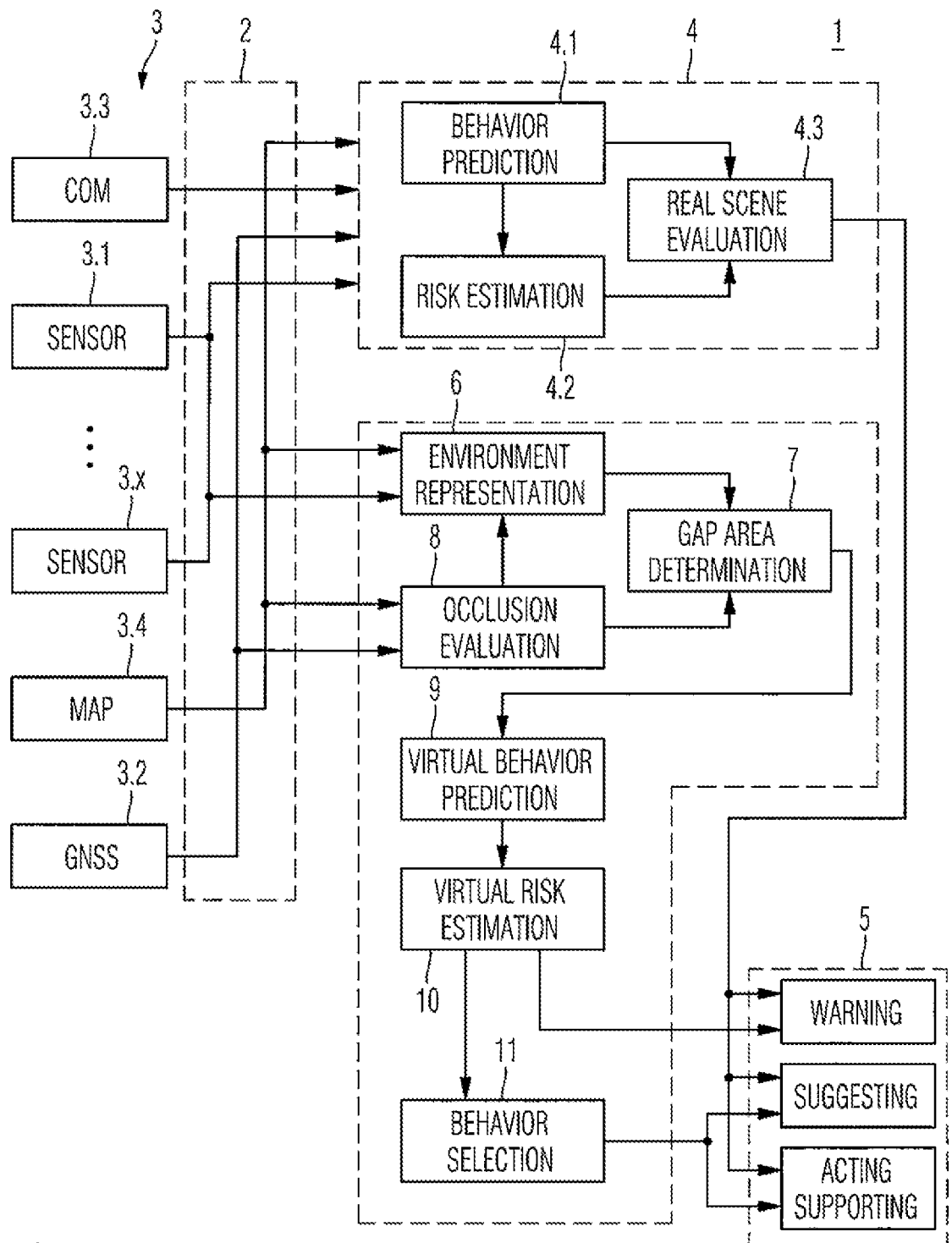
FIG. 2 shows a block diagram depicting main structural elements of the a driver assistance system according to an embodiment.

FIG. 2 shows a schematic overview with main structural elements of the system 1 for controlling a mobile device.

The system 1 comprises an acquiring unit 2, for example an interface, configured to acquire sensor data on an environment of the mobile device from at least one sensor 3.

The at least one sensor 3 typically includes one or more active sensors 3.1, . . . , 3.x, in particular radar sensors. The active sensors 3.1, . . . , 3.x can include sonar or lidar sensors. The sensor 3 may comprise one or more cameras, preferably a stereo camera as an example for a passive sensor. The sensor 3 captures data on the environment of the ego-vehicle mounting the system 1 and provides this captured data on the environment to the acquiring unit 2 as sensor data.

The sensor 3 may include a positioning system receiver 3.2 that acquires actual position data and actual orientation data of the ego-vehicle, for example by a global positioning satellite system (GNSS). The current position data and orientation data may alternatively or additionally be acquired using dead reckoning, for example using an inertial navigation system.

A communication unit 3.3 is adapted for communicating, preferably via wireless communication, with other vehicles (vehicle-to-vehicle communication) and/or traffic infrastructure (vehicle-to-infrastructure, infrastructure-to-vehicle), sometimes combined as vehicle-to-x communication. The communication unit 3.3 may also acquire map data or update map data of the environment of the vehicle.

Additionally or alternatively, the map data may be stored in a map data storage unit 3.4, wherein the acquiring unit 2 acquires the map data from the map data storage unit 3.4

A prediction unit 4 of the system evaluates the sensor data acquired by the acquiring unit 2 and based thereon analyses the traffic scene for a current time t and predicts the future evolution of the traffic scene, for example up to a time t+Δt. The submodule for behavior prediction 4.1 predicts a behavior of other traffic participants in the traffic environment around the ego-vehicle, which are captured by the sensor 3. A submodule for risk estimation 4.2 identifies a risk posed by the captured other traffic participants and their predicted future behavior. The prediction unit 4 further comprises a submodule for evaluating the real scene 4.3 as captured by the sensors 3 and their predicted future evolvement and the identified risks for the ego-vehicle involved. The real scene evaluation submodule 4.3 then prepares a recommended action for the ego-vehicle, for example a recommended trajectory, a recommended velocity, a recommended acceleration or deceleration, and provides the recommended action to the vehicle control unit 5. The general structure of a prediction unit 4 is known in the art and different approaches to predicting and evaluating a sensed traffic scene based on data acquired by sensor 3 exist and may be employed in present embodiment.

The vehicle control unit 5 controls an action of the vehicle based on the obtained recommended action from the prediction unit 4. For example the vehicle control unit 5 may issue an acoustic warning via a loudspeaker to the driver, or an optical warning via one or more signalling lights or on a screen in the vehicle.

Additionally or alternatively, the vehicle control unit 5 may suggest the recommended action to the driver, for example acoustically via the loudspeaker, or optically via the one or more signalling lights or on the screen.

Additionally or alternatively, the vehicle control unit 5 may support the driver to execute the recommended action, for example by exerting a force on a control lever, for example a steering wheel in order to urge the driver to a recommended steering angle, and/or to exert a recommended deceleration via the brake pedal.

Additionally or alternatively, the vehicle control unit 5 may itself initiate executing the recommended action in an autonomously operating vehicle or a vehicle operating in a supervised autonomous driving mode.

An environment modelling unit 6 is configured to generate an environment representation based on the acquired sensor data. In particular the environment representation is generated based on the acquired map data using the positioning data and orientation data provided by the acquiring unit 2.

The system 1 further includes a coverage gap area determining unit 7 configured to determine at least one area in the environment of the vehicle, wherein for the at least one area either a confidence for the acquired sensor data is below a threshold and/or no sensor data is available, for example due to structures occluding the area to the sensor 3. The gap area determination unit 7 uses the results of an occlusion evaluation unit 8, which analyses map data, position data, and orientation data in combination with data of the sensor 3, which describes for example a theoretical sensor coverage area, in particular a maximum sensor range and/or target detection characteristics of the sensor 3.

A virtual behavior prediction unit 9 includes the functions of a virtual traffic entity determining unit configured to generate at least one virtual traffic entity in the at least one determined area. The virtual traffic entity is modelled to interact with the at least one predicted behavior of the vehicle. For example, predicted trajectories of the ego-vehicle and of the determined virtual traffic entity may intersect with a certain probability, or a distance between a predicted trajectory of the ego-vehicle and of a virtual predicted trajectory of the virtual traffic entity falls below a predefined threshold at a future point in time.

The virtual behavior prediction unit 9 further includes the functions of a risk estimation unit which calculates or estimates a risk measure for each combination of the predicted virtual behavior of the at least one virtual traffic entity and the predicted behavior of the vehicle.

A virtual risk evaluation unit 10 evaluates the calculated risk measure and controls the vehicle control unit 5 to execute a controlling action, for example to output a warning based on the evaluated risk measure. A warning may be output when the evaluated risk measure signals a possible danger of collision on an intersection ahead with a probability for a collision exceeding a predetermined threshold.

A behavior selection unit 11 controls the vehicle control unit 5 to execute a controlling action such as suggesting to the driver a recommended action or to support a suitable action of the driver based on the evaluated risk measure.

The individual units (modules) of the system 1 may be implemented in separate hardware units or modules interacting with each other or in form of plural computer program modules implemented in software, stored in one or more memories and running on the processor when executed.

Figure 3:
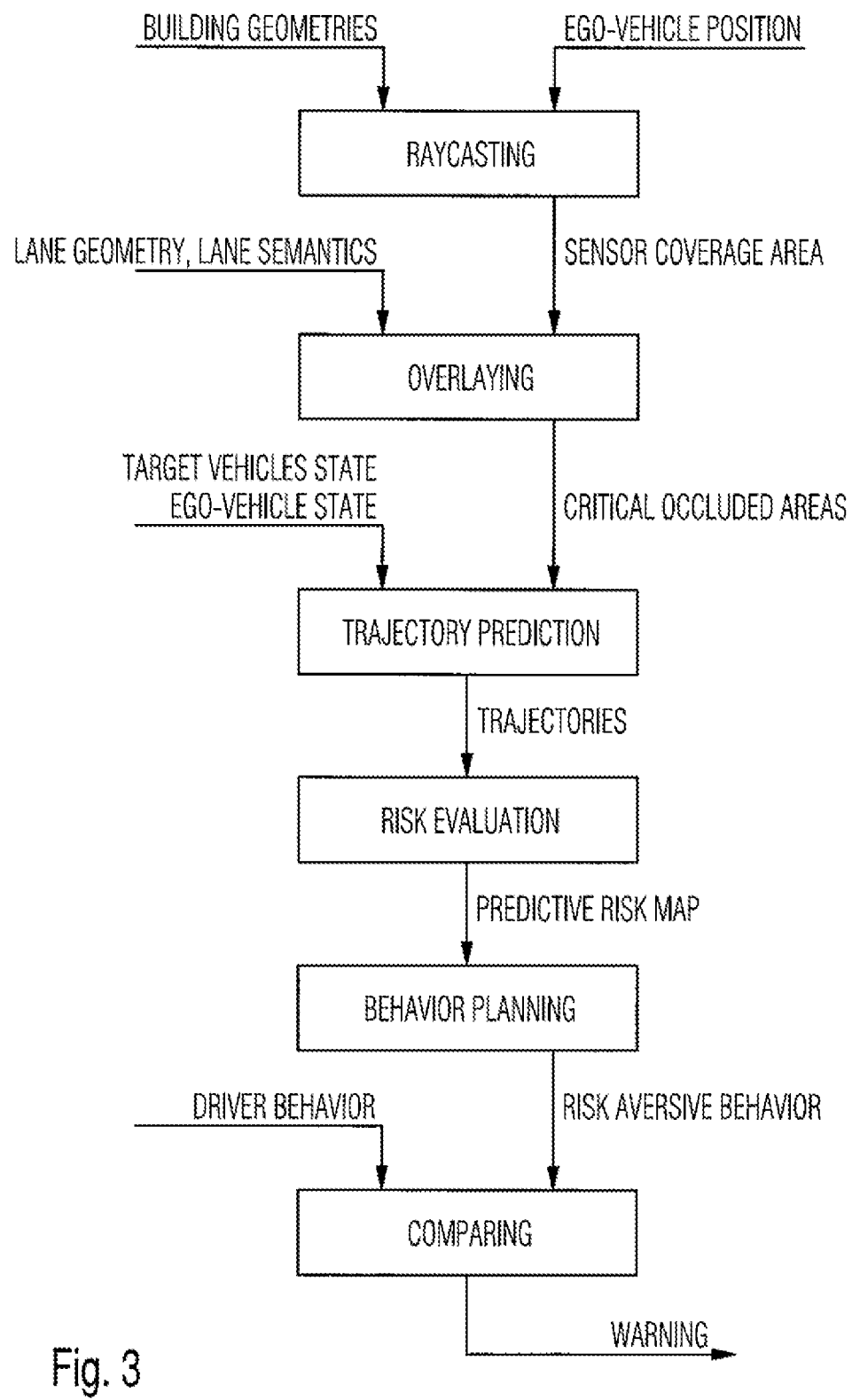
FIG. 3 shows a flowchart for an intersection warning system according to an embodiment.

FIG. 3 shows a flowchart for an intersection warning system as a more specific example for a driver assistance system according to an embodiment. The specific method steps of the flowchart in FIG. 3 are further discussed in more depth with respect to the succeeding figures.

The method for an intersection warning system starts with acquiring data on building geometries of buildings along a driving path and a trajectory of the ego-vehicle. Furthermore, the position of the ego-vehicle is acquired. A sensor coverage area is determined, for example using raycasting based on the acquired building geometries, the ego-vehicle position and further sensor data.

Further using lane geometry and lane semantics which, for example, can be derived from the acquired map data, critical occluded areas can be identified in the sensor coverage area by overlaying the sensor coverage area and the map data aligned to each other.

Figure 4:
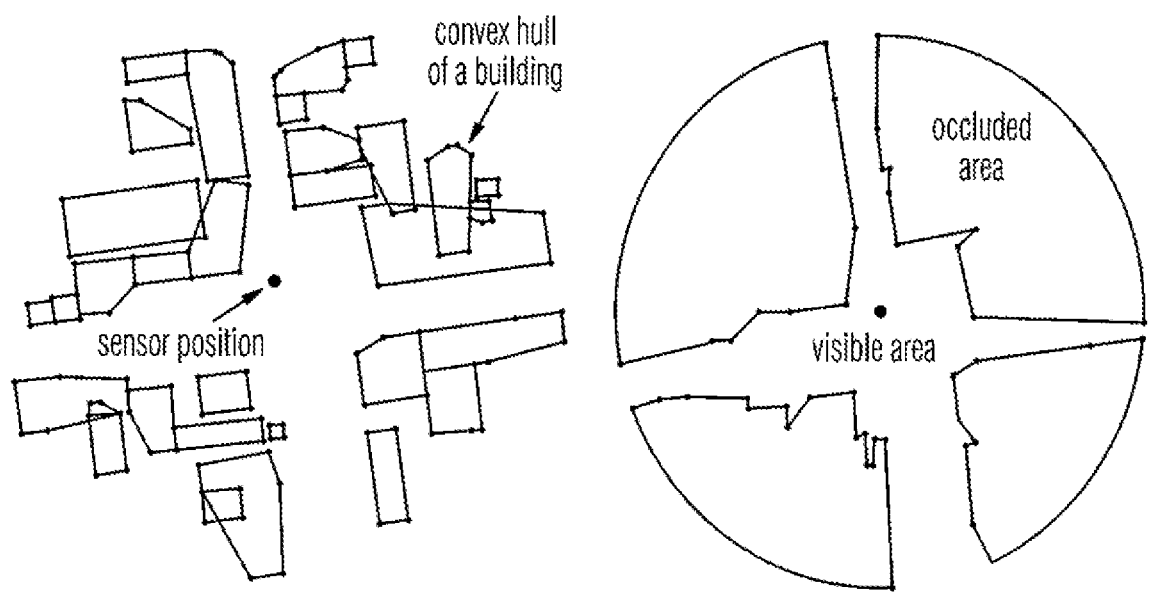
FIG. 4 depicts a method for estimating an occluded area in a sensor coverage according to an embodiment.

FIG. 4 shows in more detail an approach for estimating an occluded area in a sensor coverage using map data and sensor position data. FIG. 4 uses an exemplary intersection in the path of the ego-vehicle. The method starts at the current position of the ego-vehicle. The map data comprises road geometries and additionally an outline of buildings close to the intersection. The outline of buildings close to the intersection determines the occluded areas in the entire area within range of the sensor. The sensor range is therefore reduced by the building geometries.

The left portion of FIG. 4 shows a sensor position and an outline of the buildings in the vicinity of the intersection. A sensor position may be acquired by using position data using a global navigation satellite system (GNSS) receiver, for example GPS or GALILEO. Further a spatial alignment of the sensor is acquired from the GNSS receiver. The position and orientation of the sensor 3 can now be aligned with the map information in the map data. The right part of FIG. 4 shows the determined occlusion properties of the buildings as determined by applying a ray casting algorithm, for example as disclosed in the publication authored by L. Barba, M. Kormann, S. Langermann, R. Siveira: "Computing a visibility polygon using few variables" in Journal of Computational Geometry, 2011, which is incorporated by reference for the details of a suitable raycasting algorithm. The result of applying the ray casting algorithm is a set of all points of a polygon that can be covered from the current sensor position corresponding to the ego-vehicle's position. The resulting polygon describes the coverage area of the sensor (visible area) and the occluded areas or gap areas which are not accessible for the sensor 3.

There exist plural methods to estimate a driver's observable area or a sensor coverage area. For using a LIDAR sensor, a three-dimensional model of the environment may be extracted, which can be used to estimate the coverage area which is observable by the LIDAR sensor. In case of the sensor 3 including a stereo camera, known object detection algorithms can be utilized to detect for example other vehicles in the traffic scene reducing the coverage area of the stereo camera sensor. The embodiment discussed in depth focuses on occlusions from static objects such as buildings. Those static objects and their relevant dimensions are to be extracted from publicly available map data, for example OpenStreet Map.

The map data comprises lane precise geometric and semantic information. The information in the map data is used to extract those lanes of the intersecting roads, on which potentially critical entities might approach the intersection. The semantic information includes information defining how incoming lanes to the intersection are connected to outgoing lanes. Potentially critical and therefore relevant incoming lanes are for example lanes which attribute a right-of-way with respect to the lane on which the ego-vehicle is currently driving. By overlaying the map data of the vicinity of the intersection, which contains a road topology of relevant incoming lanes with the coverage area, occluded lane segments representing potential risk sources at the intersection can be identified as critical occluded areas.

In a first step (preprocessing step) the method searches for buildings close to the intersection ahead of the ego-vehicle and on sides of the road leading to the intersection. The method may define the geometric center of the identified buildings (relevant buildings), for example with help of a k-tree and represents each relevant building with its ground planes convex hull. The procedure of the multi-dimensional binary search tree (k-tree) is a data structure for storage of information to be retrieved by associative searches. For details reference to the paper "Multidimensional binary search trees used for associative searching by J. L. Bentley, in: Communications of the ACM 1975, pp. 509 to 517 is made, which is incorporated for reference for multi-dimensional binary search tree (k-tree) algorithms.

The left portion of FIG. 4 shows the resulting representation of the relevant buildings around the intersection.

In a second step, the coverage area (region of visibility) is determined. The determination starts with theoretical detection area of the sensor 3. For simplicity a circular detection area with a predetermined radius r, for example r=50 m, around the current position of the sensor or ego-vehicle is assumed. The theoretical detection area describes the region, in which the sensor is assumed to provide reliable measurements for objects in a typical traffic scene for areas which are not occluded by other structure such as buildings. The raycasting algorithm is employed in which only corner points of the convex hull of each structure (building) are targeted. A multi-line separating the coverage area from the area occluded by each considered object is obtained. An estimated coverage area of the sensor 3 is then the result of subtracting the occluded area of each structure from the theoretical coverage area of the sensor 3. The estimated coverage area of the sensor 3 is shown in FIG. 4, right portion.

Having determined the critical occluded areas, the intersection warning system continues with further taking the ego-vehicle's state, for example position, velocity, change in velocity (acceleration, deceleration), heading direction, and the corresponding states of other detected traffic participants' vehicles (target vehicles) into account and continues in FIG. 3 by predicting a set of future trajectories of the ego-vehicle and of the other traffic participants respectively.

The aim of the method is to assess the upcoming risk to enable the evaluation of the ego-vehicle's behavior and to allow the planning or generation of risk-aversive future behavior of the ego-vehicle. This aim requires predicting of possible future traffic scene evolvement including the impact of all detected traffic participants. Besides the entities captured by the sensor 3, it is necessary to consider entities of the traffic scene, which cannot be detected by the ego-vehicle's sensors, but whose existence may nevertheless cause risks for the ego-vehicle, for example, entities of the traffic scene which approach the same intersection as the ego-vehicle, but which are occluded by a near building or other structural elements of the traffic scene. Therefore, the inventive method estimates possible positions, where such non-observable critical entities may be located. Further, the inventive method predicts the future behavior of the non-observable entities.

The acquired map data, for example OpenStreet Map, may provide a center line of each road element and intersection points of where road elements intersect. In order to estimate locations of virtual traffic entities, the map data is enhanced with semantic and geometric information on a level of lanes of the road.

Figure 5:
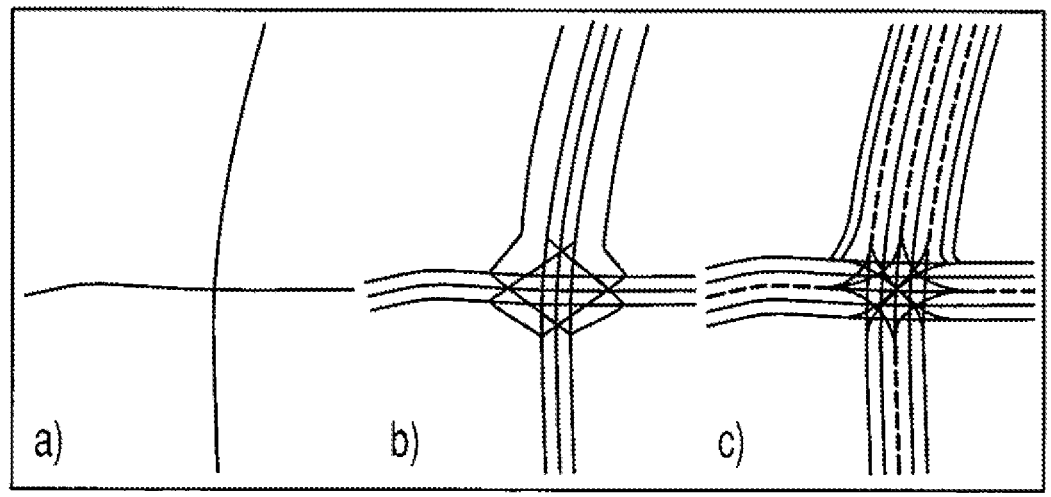
FIG. 5 illustrates an extension of basic map data in order to obtain detailed lane level geometries of an intersection.

FIG. 5 illustrates a respective extension of map data in order to obtain detailed lane geometries of the intersection. The left portion of FIG. 5 illustrates acquired map data in form of center lines of each road and the intersection point for an intersection. The mid portion of FIG. 5 shows the inferred lane semantics, in particular which incoming lane of the intersection enables to leave the intersection at which exit lanes. The right portion of FIG. 5 depicts the result of enriching the map data to the lane level. The discussed embodiment does illustrate only one possibility. The inventive approach may be equally advantageously employed on acquired map data which includes more detailed data on lane level than provided in the present embodiment, for example OpenStreetMap.

Having used the lane semantics to determine the incoming lanes of the intersection, all incoming lanes are selected which have a right-way-priority over the ego-vehicles current lane to obtain the relevant incoming lanes. By overlaying the coverage area with the relevant lane geometries, a geometric estimate of those relevant lane geometries in the environment representation which cannot be monitored by the ego-vehicle's sensors is obtained.

Virtual traffic entities might be located everywhere in the occluded areas of the relevant lane segments with a simultaneously highly uncertain behavior. Instead of considering a virtual traffic entity at every possible occluded position on all relevant lanes, a preferred embodiment defines for each relevant lane only one virtual traffic entity which is located at the position of the occluded relevant lane portion closest to the intersection under consideration.

Subsequently, a future evolution is to be predicted. For predicting the virtual traffic entities trajectory a constant velocity model can be used in a longitudinal direction along a center line of the at least partially occluded relevant lane. For example a constant velocity of 40 km/h can be used for the velocity of the virtual traffic entity being a vehicle in a traffic environment located within a city. Other traffic environments and other types of traffic participants as virtual traffic entity on the relevant lane may advantageously require other velocities. More elaborate prediction models for trajectory prediction of the virtual traffic entity may be used in other embodiments. As no sensory measurements of the virtual traffic entity are available, a rough approximation of its future behavior is applied here with respective benefits in terms of processing requirements of the intersection warning system.

An advantageous embodiment is adapted to stop the trajectory prediction of the virtual traffic entity, when the predicted trajectory of the virtual traffic entity reaches the middle of the intersection and thereby at most critical position. This predicted trajectory represents worst-case scenario for a behavior of the virtual traffic entity with regard to the ego-vehicle. This embodiment therefore enables a computationally efficient way to reproduce different positions and also, to some extent, velocity profiles of the virtual traffic entity.

Figure 6:
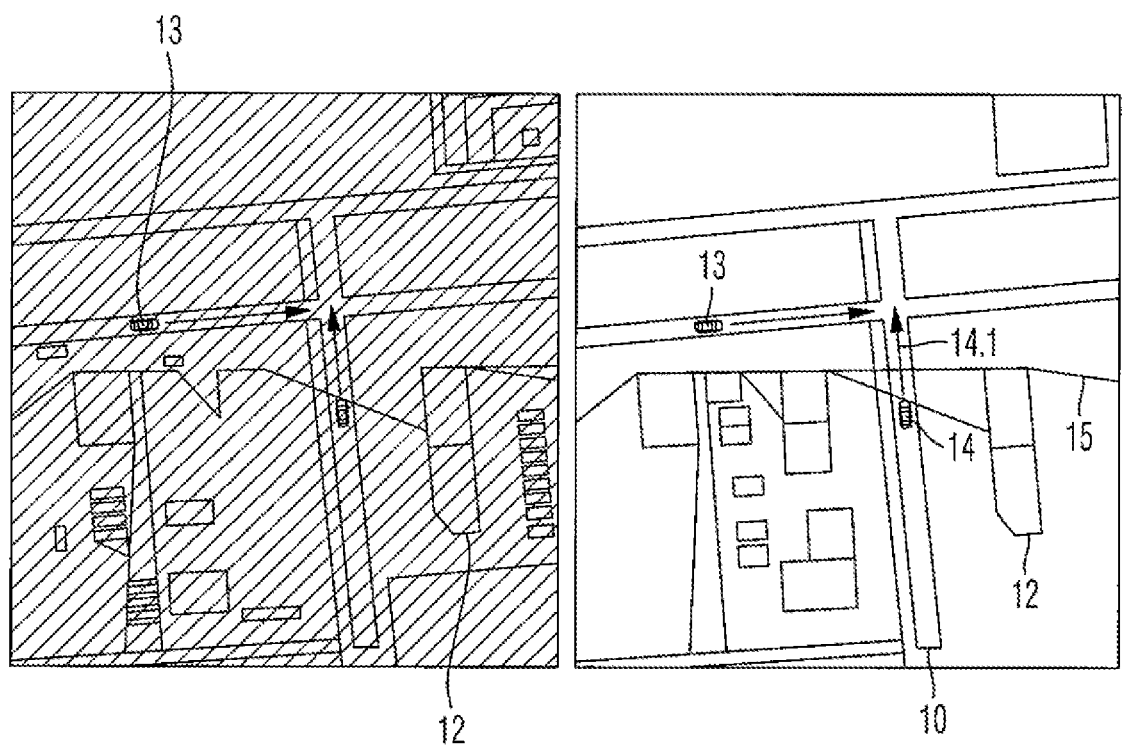
FIG. 6 shows an exemplary view of a road intersection with occluded areas, FIG. 7 generation of a risk map according to an embodiment, FIG. 8 provides an example of behavior planning using a predictive risk map, and FIG. 9 provides a scheme for the first, second and third behavior alternatives defined by their corresponding acceleration values in different levels of intervention characterized by a respective acceleration value range, according to an embodiment.

FIG. 6 provides an exemplary view of a road intersection with occluded areas and illustrates a procedure of modelling virtual traffic entities further. The ego-vehicle 13 approaches the intersection. The coverage area of the on-board sensor 3 is restricted due to occlusions caused by buildings 13. A virtual vehicle 14 as a virtual traffic entity 14 is located on the relevant critical lane 16 at a boundary 15 of the coverage area with the occluded area with a longitudinal velocity profile indicated by a velocity vector 14.1 pointing from the virtual traffic vehicle 14 towards an intersection center.

In the intersection warning method according to FIG. 3, the predicted trajectories are proved to a risk evaluation step as input for risk estimation with respect to the intersection in front of the ego-vehicle 13.

The risk evaluation includes a prediction of events as well as an estimation of the damage in case a related critical event occurs. Risk generally can be defined as an expectation value of the cost related critical future events. In the present embodiment risk is defined as a collision risk between traffic entities.

A probabilistic model to assess an event probability $P_E$ based on a survival analysis with the predicted spatio-temporal trajectories of all involved entities is derived as $$P_E(s;t,\delta_t) = S(s;t)\{\tau^{-1}(\text{states}(t+s))\delta_t\}; \quad (1)$$

according to "Predictive risk estimation for intelligent ADAS Functions", authored by Julian Eggert, in: Intelligent transportation systems conference, 2014, pp. 711-718, which is incorporated reference for the details of a predictive risk estimation. The survival function S in (1) indicates the likelihood that an entity survives until a certain time t+s in the future and starting at a current time t, wherein t is the current time, s defines a time interval and $\delta_t$ a small time interval. The total event rate $\tau^{-1}$ represents the likelihood for a critical event $$S(s;t) = \exp\left\{\int_0^s \tau^{-1}(\text{states}(t+s'))ds'\right\}; \quad (2)$$

$$\tau^{-1}(\text{states}(t+s')) = \sum_i \tau_i^{-1}(\text{states}_i(t+s')); \quad (3)$$

To cover different types of risk, the total event rate $\tau^{-1}$ can be composed of several types of single event rates $\tau_i^{-1}$, such as car-to-car collision risk or risk of skidding off the road in curves. The term states indicates that different risk contributions may depend on scene state subsets contributed by different scene entities. Only car-to-car collision risks represented by single event rate $\tau_d^{-1}$ are to be considered for the embodiment. The single event rate $\tau_d^{-1}$ is a function of the distance d of the ego-vehicle 13 and the other considered traffic entity, here the virtual traffic entity 14.

$$\tau_d^{-1} = \tau_{d,0}^{-1} \exp\{-\beta_d(d-d_{min})\};$$

The parameter $d_{min}$ denotes a minimal geometric collision distance. It is to be noted that the proposed exponential function for the event $\tau_d^{-1}$ can be exchanged to other function forms, since their main purpose is to model qualitative risk tendency given the parameters. In the exponential model, $\beta_d$ is used to quantify a steepness of the event probability increase with distance. Its value will to be have determined empirically by comparison with accident statistics.

Combining the deterministic model with a probabilistic model with a predicted damage model that uses the masses m and predicted velocities $\hat{v}$ of two vehicles involved in a collision, a risk model is obtained which is used to evaluate future evolutions of the currently sensed scene in a time continuous manner $$\text{risk}(s) = P_E(s; 0, \delta_t)\text{damage}(\text{states}(s)); \quad (5)$$

$$\text{damage}(s) \approx \frac{1}{2}\frac{m_0 m_i}{m_0 + m_i}[\hat{v}_0(s) - \hat{v}_i(s)]^2;; \quad (6)$$

Figure 7:
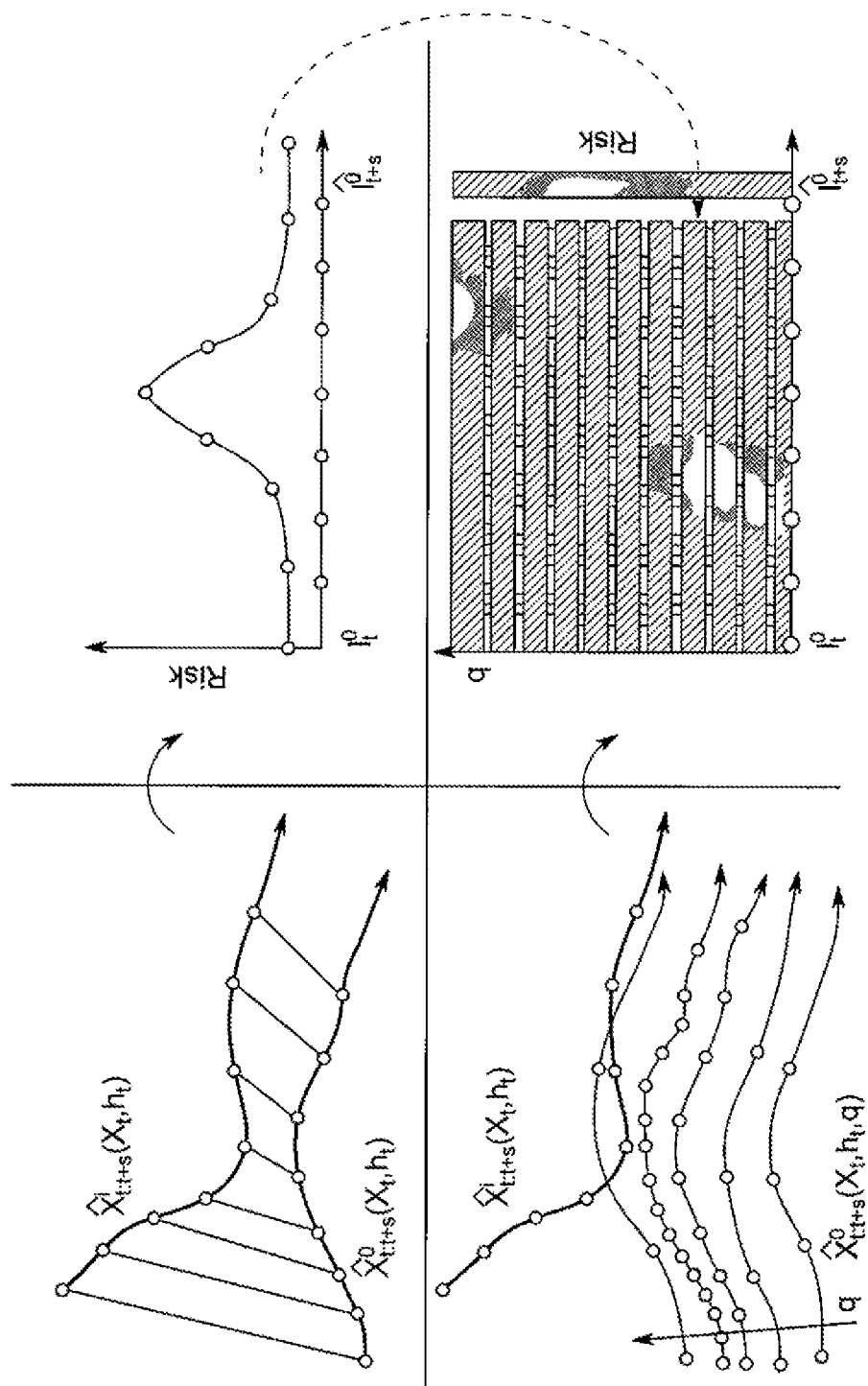

The obtained risk model is used to build predictive risk maps as shown in FIG. 7. During the process, not only the risk along a defined path $\hat{l}$ for one predicted trajectory $\hat{x}^0$ of the ego-vehicle with respect to the other vehicle's predicted trajectory $\hat{x}^i$. Instead a set of ego-vehicle trajectories $\hat{x}^0(q)$ defined by variation parameters q is created and the risk for each trajectory is evaluated. Using the predicted ego-vehicle's velocity $\hat{v}^0$ as q, a predictive risk map can be composed, which indicates how risky a chosen ego-vehicle velocity will be for the predicted future time t+s.

FIG. 7 illustrates the generation of a predictive risk map. In the upper portion of FIG. 7, using the risk model is shown. The lower portion of FIG. 7 illustrates a variation of the ego-vehicle's velocities and the impact on the predictive risk map.

The generated predictive risk map is then input for the step of behavior planning which succeeds in FIG. 3 to the step of risk evaluation. With predictive risk maps and evaluation of future behavior alternatives for the ego-vehicle 13 in terms of collision risk becomes possible.

In an embodiment, a modified version of the rapidly exploring random tree algorithm is used to plan a best possible velocity profile as a path through predictive risk maps, thereby minimizing risk and maximizing utility considerations. The generally known approach is for example discussed in depth by F. Damerow and J. Eggert in "Balancing risk against utility; behavior planning using predictive risk maps", in: Intelligent Vehicles Symposium, 2015, which is incorporated by reference for the purpose of planning a best possible velocity profile using predictive risk maps. The result is a planned trajectory for the ego-vehicle 13 which is globally optimal.

Figure 8:
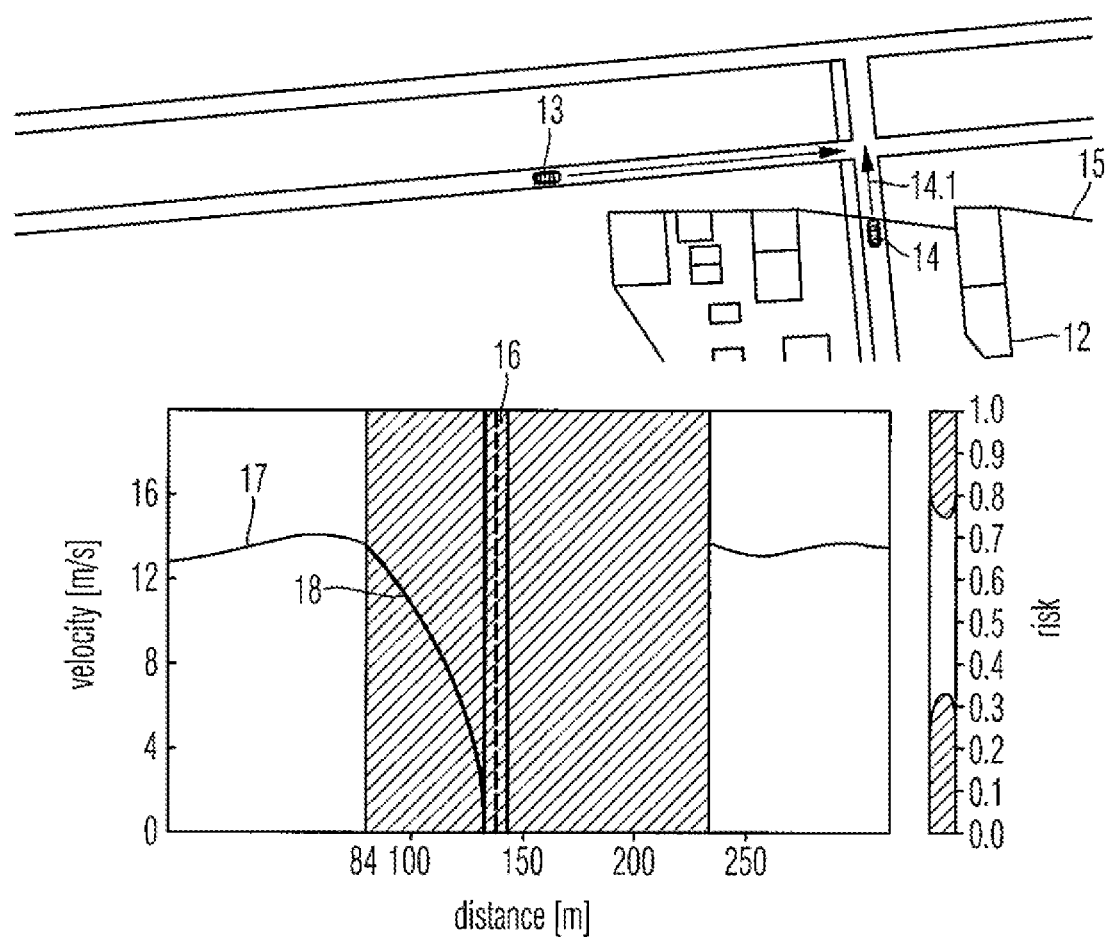

FIG. 8 displays the outcome of the algorithm for an intersection scenario with the ego-vehicle 13 and a virtual traffic entity 14 determined according to the invention.

The calculated risk for the intersection scenario in the lower portion of FIG. 8 shows a predicted velocity curve 17, an emergency curve 18 and at a distance 16 of about 150 m from the current position of the ego-vehicle 13 the intersection. Due to the occlusions by the buildings 12 to the right hand of the ego-vehicle 13, a portion of the lane of the road leading from the right to the intersection is not visible for the sensor of the ego vehicle 13. A virtual traffic entity 14 determined as previously explained is positioned on the boundary 15 between the coverage area of the sensor 3 and the occluded area. The predicted velocity curve 17 is determined such that a risk for the ego-vehicle 13 to collide with a potentially other vehicle not detected by the sensor 3 but represented by the virtual traffic entity 14 is minimized.

The emergency curve 18 is determined such that the ego-vehicle 13 comes to stop before arriving at the intersection and therefore before colliding with another vehicle arriving from the right hand lane and having right-of-way.

The risk measure calculation and evaluation is repeated in discrete time steps almost continuously. Accordingly, the predicted velocity curve 17 and the emergency curve 18 are updated also regularly, varying due to the varying obstructions of sensor coverage by the building 12, while the ego-vehicle is driving towards the intersection.

An advantageous approach for evaluating future behavior alternatives with low computational costs uses a simple planning algorithm for intersections that considers three behavior alternatives for the ego-vehicle 13: a first behavior alternative is that the ego-vehicle 13 continues driving with a constant velocity. A second behavior alternative has the ego-vehicle 13 brake with constant deceleration such that stopping at a stop line of the ego-lane at the intersection is possible. A third behavior alternative includes the ego-vehicle 13 accelerating with a constant acceleration to safely pass in front of the virtual traffic entity 14.

In a first step, the three behavior alternatives are calculated. Each of the first, second and third behavior alternative is represented by a respective acceleration or deceleration value. In the second behavior alternative with the ego-vehicle 13 driving with a constant acceleration value $$a_{const} = 0 \text{ m/s}^2; \qquad (7)$$

applies. A deceleration value for the first behavior alternative can be calculated according to $$a_{stop} = -\frac{v_0^2}{2d_{s1}}; \qquad (8)$$

with a current velocity of the ego-vehicle 13 $v_0$ and a distance $d_{s1}$ to an intersection entry point of the ego-lane, which is the lane on which the ego-vehicle 13 drives. The distance $d_{s1}$ can for example be determined using the enhanced map data generated in step S2 for generating an environment representation in FIG. 1. For the third behavior alternative, in order to pass ahead of potentially approaching vehicles by standing clear from the virtual traffic entity 14, the risk map can be used. Based on the risk map, a target velocity $v_{target}$ is determined that is to be reached at the intersection in order to pass the intersection with a predetermined low risk value. The corresponding acceleration value for the third behavior alternative is then calculated to $$a_{acc} = \frac{v_{target}^2 - v_0^2}{2d_{cp}}; \qquad (9)$$

with $d_{cp}$ as the distance to the expected crossing point on the intersection between the predicted trajectory of the ego-vehicle 13 and the predicted trajectory of the virtual traffic entity 14.

A second step in the behavior planning of FIG. 3 includes evaluating the three behavior alternatives with their respective representative acceleration values $a_{const}$, $a_{stop}$ and $a_{acc}$ in terms of the implied risk.

Additionally and preferably, further risk sources may be considered. For example other vehicles than the virtual traffic entity 14 and indeed detected by the sensors of the ego-vehicle 13 may also considered in the step of behavior planning.

A risk value for each of the first, the second and the third behavior alternative is calculated. The calculated values are each compared to a threshold. In case a risk value for a behavior alternative exceeds a predetermined threshold value, the corresponding behavior alternative can be neglected and excluded from further consideration. This results in the first second and third behavior alternative being of a low risk remaining, and being acceptable as foresighted driving behavior.

In an embodiment, the ADAS is configured to use planned risk-aversive behavior alternatives characterized by the acceleration values $a_{const}$, $a_{stop}$ and $a_{acc}$ when an actually currently performed behavior of a human driver of the ego-vehicle 13 is deemed critical. This can be achieved by categorizing the first, second and third behavior alternatives based on their corresponding acceleration values in different levels of intervention, each level of intervention being characterized by respective acceleration value ranges.

The determined risk aversive behavior of the behavior planning step in FIG. 3 may then be compared with an actually executed behavior of the driver of the ego-vehicle 13 in a subsequent comparing step according to FIG. 3.

Figure 9:
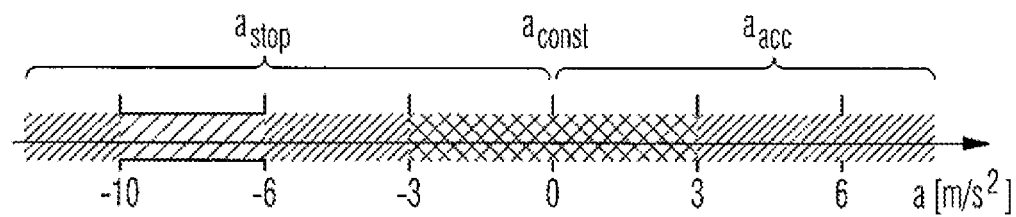

For example, in the embodiment in FIG. 9 four levels of intervention are defined: a first level of intervention deemed "comfortable", a second level of intervention deemed "heavy", a third level of intervention deemed "emergency" and a fourth level intervention deemed "non-reachable". It is apparent that other definitions of categories for different acceleration values are possible.

The second acceleration value for the second behavior alternative is in any case in the comfortable acceleration range according to the embodiment displayed in FIG. 9.

The first acceleration value $a_{stop}$ and the third acceleration value $a_{acc}$ may differ depending on the current situation risk and thus reach different levels of intervention. If, for example, both first and third acceleration values $a_{stop}$ and $a_{acc}$ are outside the comfortable acceleration range, a driver behavior is defined as being a critical driver behavior. Given this case, the ego-vehicle 13 would operate near its physical limits when using either of the first and third acceleration values $a_{stop}$ and $a_{cc}$. In case that either of the first and third acceleration values $a_{stop}$ and $a_{acc}$ is in the non-reachable acceleration value range, the calculated values for the first and third acceleration values $a_{stop}$ and $a_{acc}$ are to be disregarded because it is not possible to use them.

The comparing step results in outputting a warning, if $a_{const}$ is not among the actions proposed by the ADAS and further $$a_{stop} \leq -3 \text{ m/s}^2 \wedge a_{acc} \geq 3 \text{ m/s}_2; \qquad (10)$$

Additionally or alternatively, the behavior alternative with the lowest level of intervention corresponding to the lowest acceleration value for the ego-vehicle's velocity may be suggested to the driver.

If the driver is not appropriately or timely responding to the warning and/or suggestion provided by the ADAS, a control mode may be adapted to step in. For example the control mode may be configured to intensify the warning signal over a predefined time period and when the predefined time period elapses, the ADAS may initiate emergency braking, when the best possible action according to the lowest level of intervention is $a_{stop}$ in the emergency range of acceleration:

$$-10 \text{ m/s}^2 \leq a_{stop} \leq -6 \text{ m/s}^2; \quad (10)$$

The intersection warning system as an example of an ADAS or part of an ADAS accordingly is enabled to not only evaluate collision risks from traffic scene entities such as vehicles detected by the an on-board sensor, but also integrates evaluating collision risks originating from virtual vehicles which might suddenly appear in the future out of presently occluded areas in the traffic environment which are not covered by the on-board sensor. Based on the enhanced analysis capabilities of the inventive method, risk-aversive behavior alternatives (behavior options) are planned, suggested to a driver or even autonomously executed via respective actuators of the ego-vehicle 13. The limitations of sensor range and sensor coverage are therefore significantly enhanced, without requiring additional information from external sensors or other traffic participants at only the expense of suitable map data.

Simulation reveals that the proposed systems behavior matches the general behavior of a correctly acting human driver. In traffic scenarios in which the actually recognized human behavior deviates from a proposed behavior of the system, a warning and/or a suggested trajectory, for example with the lowest level of intervention may be provided to a driver.

Occlusions are discussed with occlusions by buildings. The sensor coverage can with a same effect be occluded by other static objects such as terrain features such as hills, trees and foliage, parked cars, advertising signs or even moving objects such as other vehicles.

The behavior planning and executing action may additionally take into account human factors such as reaction time or driving experience. Furthermore, traffic signs and traffic rules may be integrated into the behavior planning and controlling a suitable action steps.

The invention claimed is:

1. A method for controlling a mobile device using a driver assistance system or an autonomous driving system, the method comprising steps of:
   acquiring sensor data on an environment of the mobile device from at least one sensor,
   generating an environment representation based on the acquired sensor data,
   predicting at least one behavior of the mobile device,
   wherein the method further comprises steps of
   determining at least one area in the environment of the mobile device, wherein for the at least one area either a confidence for the sensor data is below a threshold or no sensor data is available,
   generating at least one virtual traffic entity in the at least one determined area, wherein at least one behavior of the virtual traffic entity is predicted which can influence the at least one predicted behavior of the mobile device,
   estimating a risk measure for each combination of the at least one behavior of the virtual traffic entity and the predicted behavior of the mobile device,
   evaluating the calculated risk measure, and
   executing a controlling action for the mobile device based on the evaluated risk measure.

2. The method for controlling a mobile device according to claim 1, further comprising a step of
   predicting at least one virtual behavior of the at least one virtual traffic entity, and
   in the step of estimating a risk measure, a risk measure for each combination of the virtual behavior of the at least one virtual traffic entity and each predicted behavior of the mobile device is estimated.

3. The method for controlling a mobile device according to claim 1, further comprising a step of
   calculating a utility measure for each predicted behavior of the mobile device, and in the step of executing a controlling action for the mobile device, the controlling action is determined based on the calculated risk measure and the calculated utility measure.

4. The method for controlling a mobile device according to claim 1, wherein
   in the step of executing a controlling action a warning to a driver of the mobile device is issued if the estimated risk measure exceeds a predetermined risk threshold, the driver initiated driving action is supported or the driving action of the mobile device is executed autonomously.

5. The method for controlling a mobile device according to claim 1, wherein
   in the step of acquiring sensor data on an environment of the mobile device, map data of the environment of the mobile device is acquired.

6. The method for controlling a mobile device according to claim 5, wherein
   the acquired map data includes information on buildings or environment entities.

7. The method for controlling a mobile device according to claim 5, wherein
   in the step of determining the at least one area in the environment of the mobile device, a sensor position and a sensor orientation in the environment representation and sensor coverage occlusions based on the map data, in particular the information on buildings and environment structures are determined.

8. The method for controlling a mobile device according to claim 1, further comprising steps of
   obtaining further risk information and further predicted behavior of at least one target object in the environment of the mobile device, wherein the at least one target object is detected by the at least one sensor, and
   fusing the obtained further risk information and further predicted behavior of the at least one target object with the estimated risk measure to generate fused risk and behavior data,
   wherein in the step of evaluating the risk measure, the fused risk and behavior data is evaluated, and
   wherein in the step of executing the controlling action, the controlling action is executed based on the evaluated fused risk and behavior data.

9. A system for controlling a mobile device, the system comprising:
   an acquiring unit configured to acquire sensor data on an environment of the mobile device from at least one sensor,
   an environment modelling unit configured to generate an environment representation based on the acquired sensor data,
   a prediction unit configured to predict at least one behavior of the mobile device, and
   wherein a gap area determining unit is configured to determine at least one area in the environment of the mobile device, wherein for the at least one area either a confidence for the sensor data is below a threshold or no sensor data is available, that a virtual traffic entity determining unit is configured to generate at least one virtual traffic entity in the at least one determined area, wherein the virtual traffic entity is adapted to interact with the at least one predicted behavior of the mobile device, that a risk estimation unit is configured to estimate a risk measure for each combination of the at least one virtual traffic entity and the predicted behavior of the mobile device, that an evaluation unit is configured to evaluate the calculated risk measure, that a vehicle control unit is configured to execute a controlling action for the mobile device based on the evaluated risk measure.

10. The system for controlling a mobile device according to claim 9, wherein the system is a driver assistance system or an autonomous driving system for a mobile device.

11. A mobile device equipped with the system according to claim 9.

\* \* \* \* \*